(12) United States Patent
Watts

(10) Patent No.: US 11,363,334 B2
(45) Date of Patent: Jun. 14, 2022

(54) METHODS AND APPARATUS TO IDENTIFY USER PRESENCE TO A METER

(71) Applicant: The Nielsen Company (US), LLC, New York, NY (US)

(72) Inventor: David Watts, Lutz, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/437,993

(22) Filed: Jun. 11, 2019

(65) Prior Publication Data
US 2020/0396502 A1 Dec. 17, 2020

(51) Int. Cl.
H04N 21/442 (2011.01)
H04N 21/475 (2011.01)
H04N 21/422 (2011.01)

(52) U.S. Cl.
CPC . *H04N 21/44213* (2013.01); *H04N 21/42224* (2013.01); *H04N 21/4753* (2013.01)

(58) Field of Classification Search
CPC ....... H04N 21/44213; H04N 21/42224; H04N 21/4753
See application file for complete search history.

(56) References Cited

U.S. PATENT DOCUMENTS

| | | | |
|---|---|---|---|
| 5,481,294 A | 1/1996 | Thomas et al. | |
| 6,850,149 B2 | 2/2005 | Park | |
| 8,014,768 B2 | 9/2011 | Ackley | |
| 8,937,534 B2 | 1/2015 | Kreiner et al. | |
| 2007/0011040 A1 | 1/2007 | Wright et al. | |
| 2013/0179914 A1 | 7/2013 | Falcon | |
| 2013/0312018 A1* | 11/2013 | Elliott | H04N 21/45 725/12 |
| 2015/0189378 A1* | 7/2015 | Soundararajan | H04N 21/4126 725/12 |
| 2016/0205436 A1 | 7/2016 | Rowe | |
| 2016/0330517 A1* | 11/2016 | Soundararajan | H04N 21/44231 |
| 2017/0272824 A1 | 9/2017 | Bunner | |
| 2018/0316966 A1 | 11/2018 | Krieger et al. | |

OTHER PUBLICATIONS

Siteground, "How to Connect to cPanel Through my Mobile Device?" [www.siteground.com], retrieved on Feb. 15, 2019, 2 pages.

(Continued)

*Primary Examiner* — Nathan J Flynn
*Assistant Examiner* — Christine A Kurien
(74) *Attorney, Agent, or Firm* — Hanley, Flight & Zimmerman, LLC

(57) ABSTRACT

Methods, apparatus, systems and articles of manufacture are disclosed to identify user presence to a meter. An example apparatus includes a user input receiver to obtain presence information from a panelist via a prompt displayed by a user interface of the apparatus, the presence information indicating that the panelist is present at the meter separate from the apparatus, a configuration controller to package the presence information and insert an indication in the packaged presence information, the indication indicating the packaged information is to be sent to the meter via a remote server, and a wireless transceiver to transmit the packaged presence information to the remote server.

27 Claims, 10 Drawing Sheets

(56) References Cited

OTHER PUBLICATIONS

International Searching Authority, "Written Opinion," issued in connection with U.S. Patent Application No. PCT/US2020/037262, dated Sep. 21, 2020, 5 pages.

International Searching Authority, "Search Report," issued in connection with U.S. Patent Application No. PCT/US2020/037262, dated Sep. 21, 2020, 4 pages.

SiteGround.com, "How to connect to cPanel through my mobile device?", cPanel FAQ, 2 pages.

* cited by examiner

METHODS AND APPARATUS TO IDENTIFY USER PRESENCE TO A METER

FIELD OF THE DISCLOSURE

This disclosure relates generally to audience measurement, and, more particularly, to methods and apparatus to identify a user presence to a meter.

BACKGROUND

Audience measurement entities desire knowledge on how users interact with media devices, such as smartphones, tablets, laptops, smart televisions, etc. To facilitate such monitoring, audience measurement entities enlist panelists and install meter at a media presentation location of each of the panelists. The meter monitors media presentations and transmits media monitoring information to a central facility of the audience measurement entity. Such media monitoring information enables the audience measurement entity to, among other things, monitor exposure to advertisements, determine advertisement effectiveness, determine user behavior, identify purchasing behavior associated with various demographics, etc.

BRIEF DESCRIPTION OF THE DRAWINGS

The figures are not to scale. In general, the same reference numbers will be used throughout the drawing(s) and accompanying written description to refer to the same or like parts.

Figure 1:
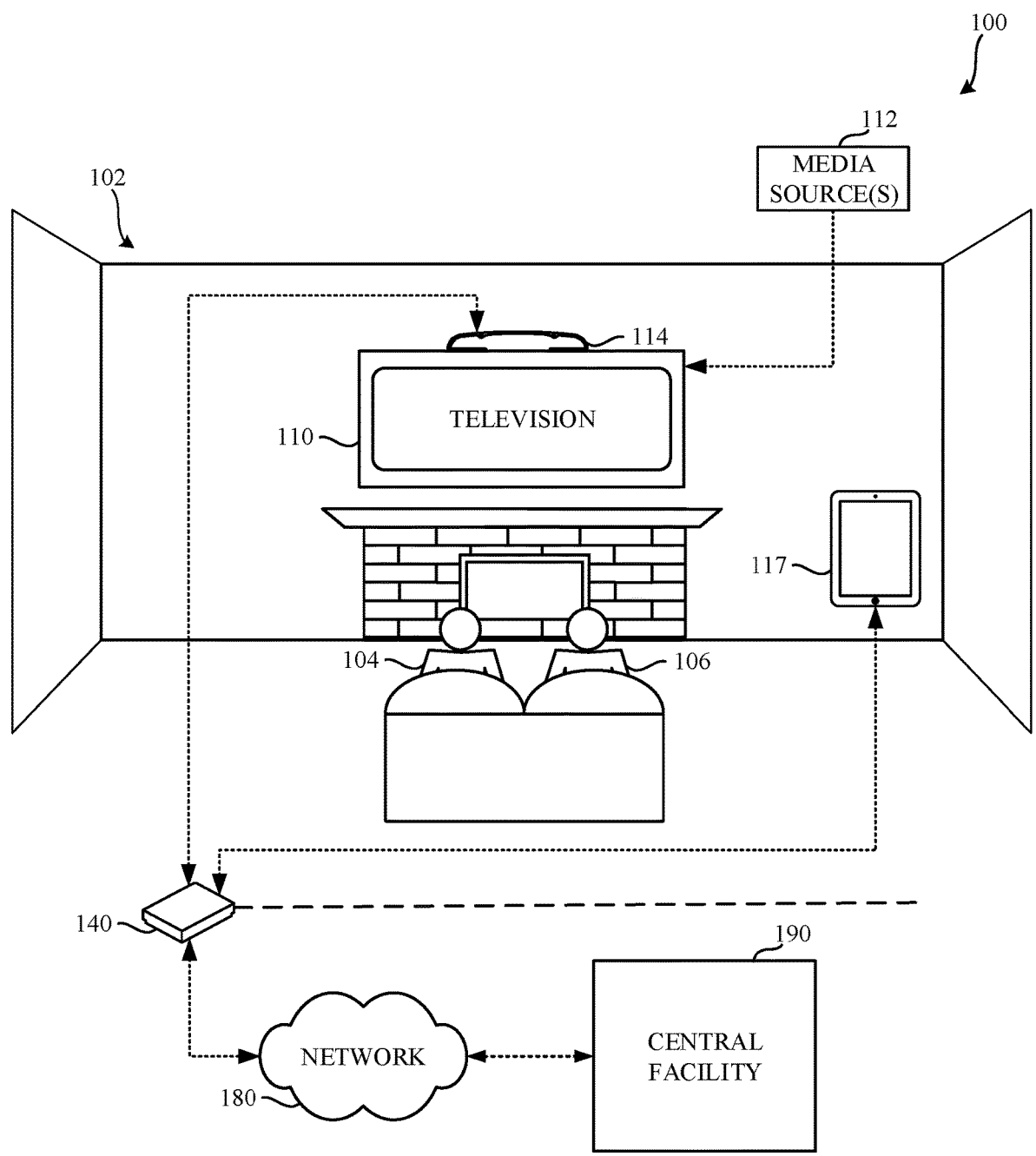
FIG. 1 is a block diagram of an example system constructed in accordance with the teachings of this disclosure for identifying user presence to a meter.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In certain media monitoring applications, a remote control device is utilized to identify presence of a panelist (e.g., a household member) to an audience measurement meter whenever the panelist is an audience member associated with a particular monitored media device (e.g., a monitored television set at a household site). For example, panelists are instructed to press a button (e.g., a button assigned to that particular panelist) when they are in a viewing audience of a monitored media presentation. In such applications, the panelist may be unable to log their corresponding audience member status with the audience measurement meter (e.g., communicate login information to the meter that the panelist is present) in the event that the remote control device becomes broken, lost, and/or otherwise decommissioned for use. For example, the power supply (e.g., batteries) of the remote control device may become unavailable. Additionally or alternatively, the remote control device may become lost and/or otherwise unavailable for use. Moreover, while panelists are instructed to press the assigned button, some panelists might not comply with such instruction if, for example, the remote control device is not within immediate reach. Such non-compliance results in inaccurate media monitoring data.

Examples disclosed herein provide methods, apparatus and articles of manufacture to enable a panelist (e.g., a household member, an audience member) to log their corresponding audience member status with the audience measurement meter (e.g., communicate login information to the audience measurement meter that the panelist is present) utilizing an application on a corresponding configuration device. In examples disclosed herein, the application is a downloadable application on a user device (e.g., smartphone, tablet, etc.) capable of communicating with a back-office server (e.g., of the audience measurement entity). In examples disclosed herein, a panelist communicates login information via the application to the back-office server. In such examples disclosed herein, the back-office server communicates such corresponding login information to the audience measurement meter.

In some examples disclosed herein, the audience measurement meter may communicate a time-out indication to the user device, via the back-office server, illustrating that the user (e.g., the audience member) is to relog into the audience measurement meter. In some examples disclosed herein, such a time-out indication may be referred to as a re-login prompt and/or a re-login indication. For example, an audience measurement meter may indicate after a threshold amount of time (e.g., forty-two minutes, sixty minutes, etc.) that a time-out has occurred and, as such, transmit a re-login prompt and/or a re-login indication to the user. In such examples disclosed herein, the audience membership meter may communicate to the user device, via the back-office server, an indication and/or prompt to re-login.

FIG. 1 is block diagram of an example system 100 constructed in accordance with the teachings of this disclosure for identifying user presence to a meter. In the illustrated example of FIG. 1, an example media presentation environment 102 includes example panelists 104, 106, an example media presentation device 110 that receives media from an example media source 112, an example meter 114, and an example configuration device 117. The meter 114 identifies the media presented by the media presentation device 110 and reports media monitoring information to an example central facility 190 of an example audience measurement entity via an example gateway 140 and an example network 180. The configuration device 117 provides panelist information (e.g., identification information of the panelist observing the media presentation device 110) for logging into the meter 114 to the central facility 190.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In some examples, the media presentation device 110 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc.

In examples disclosed herein, an audience measurement entity provides the meter 114 to the panelist 104, 106 (or household of panelists) such that the meter 114 may be installed in the media presentation environment 102. In some examples, the meter 114 is installed by the panelist 104, 106 by simply powering the meter 114 and placing the meter 114 in the media presentation environment 102 and/or near the media presentation device 110 (e.g., near a television set). In some examples, more complex installation activities may be performed such as, for example, affixing the meter 114 to the media presentation device 110, electronically connecting the meter 114 to the media presentation device 110, configuring the meter 114 to transmit media monitoring information to the central facility 190, etc. In examples disclosed herein, configuration of the meter 114 is performed by an installer (e.g., personnel from the audience measurement entity) who installs the meter 114 in the media presentation environment 102 and configures the meter 114.

The example meter 114 detects a media presentation and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.), and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for watermarks (sometimes referred to as codes) included in the presented media. In some examples, the meter 114 generates signatures (sometimes referred to as fingerprints) to identify the presented media.

In examples disclosed herein, to monitor media presented by the media presentation device 110, the meter 114 of the illustrated example senses audio (e.g., acoustic signals or ambient audio) output (e.g., emitted) by the media presentation device 110 and/or some other audio presenting system (e.g., an audio/video receiver). For example, the meter 114 processes the signals obtained from the media presentation device 110 to detect media and/or source identifying signals (e.g., audio watermarks) embedded in portion(s) (e.g., audio portions) of the media presented by the media presentation device 110. To, for example, sense ambient audio output by the media presentation device 110, the meter 114 of the illustrated example includes an example audio sensor (e.g., a microphone). In some examples, the meter 114 may process audio signals obtained from the media presentation device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. Additionally or alternatively, the meter 114 may prompt the audience member(s) to reverify their login information after a period of time (e.g., transmit a re-login prompt). The audience identification data and the exposure data can then be compiled with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In the example illustrated in FIG. 1, the meter 114 is configured to receive panelist presence information via communication with the central facility 190. In such examples, the configuration device 117 initiates communication with the central facility 190 in response to one or more of the panelists 104, 106 entering information (e.g., login information) into the configuration device 117 which identifies the particular panelist 104, 106 watching the media presentation device 110. Furthermore, the central facility 190 processes the communication from the configuration device 117 and transmits such communication to the meter 114 via the gateway 140. In examples disclosed herein, the one or more panelists 104, 106 can log into the meter 114 (e.g., communicate to the meter 114 identifying information indicating the one or more panelists 104, 106 watching the media presentation device 110) by indicating their presence to one or more configuration device(s) 117. In examples disclosed herein, the one or more panelists 104, 106 can log into the meter 114 via communication with an intermediate device (e.g., the gateway 140).

In other examples disclosed herein, the meter 114 of the illustrated example may also determine times at which to prompt the audience members to enter information to the meter 114. In such examples disclosed herein, the meter 114 communicates such an indication to the central facility 190 via the gateway 140 and, in response, the central facility 190 communicates with the configuration device 117 via the gateway 140. In other examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the acoustic sensor of the meter 114 is able to sense example audio output by (e.g., emitted by) an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

In examples disclosed herein, the configuration device 117 of the illustrated example of FIG. 1 is implemented by a mobile device (e.g., a smartphone, an Apple iPad®, etc.). However, any other type of device may additionally or alternatively be used. In examples disclosed herein, the configuration device 117 is provided by the audience measurement entity to an installer (e.g., a person affiliated with the audience measurement entity and tasked with installing and/or configuring the meter 114, one of the panelists 104, 106, etc.). However, in some examples, the example configuration device 117 may be implemented using an application installed on a device (e.g., an application, which is sometimes referred to as an "app", etc.). Additionally or alternatively, in some examples disclosed herein, the configuration device 117 may be a cellular-enabled device. In examples disclosed herein in which the configuration device 117 is a cellular-enabled device, the configuration device 117 communicates directly with the central facility 190 via a suitable communication path such as, for example, a cellular network (e.g., a 3G network, a 4G network, a Long-Term Evolution (LTE) advanced network, a 5G network, etc.).

The example gateway 140 of the illustrated example of FIG. 1 is a router that enables the meter 114, the configuration device 117, and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 180 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the configuration device 117, the media presentation device 110, etc., to transmit and/or receive data via the Internet. Alternatively, the gateway 140 may be coupled to such a LAN. In examples disclosed herein, the example gateway 140 and/or connectivity to the Internet via the gateway 140 is provided by the panelists 104, 106. That is, the example gateway 140 is a device that is owned and/or operated by the panelists 104, 106, and is not provided by the audience measurement entity. In some examples, the example gateway 140 may be provided by an Internet Service Provider (ISP) to facilitate communication between the LAN provided by the gateway 140 and the network 180 (e.g., the Internet). In examples disclosed herein, the configuration device 117 utilizes the LAN hosted by the gateway 140 to transmit and/or receive instruction to the central facility indicating identifying information of one or more of the panelists 104, 106 watching the media presentation device 110. Additionally, in examples disclosed herein, the meter 114 utilizes the LAN hosted by the example gateway 140 to transmit and/or receive information to and/or from the central facility 190. Transmitting information using a LAN provided by the example gateway 140 ensures that information is reliably transmitted to the central facility 190. Advantageously, other costlier approaches to transmitting information to the central facility 190 such as, for example, inclusion of a cellular transceiver in the meter 114 and/or configuration device 117 need not be utilized.

The network 180 of the illustrated example is a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114 and the configuration device 117. For example, the central facility 190 receives a first communication from the configuration device 117 indicating the one or more panelists 104, 106 watching the media presentation device 110. In addition to such an example, the central facility 190 transmits a second communication to the meter 114 of such panelists identifying information. As such, the one or more panelists 104, 106 may log into the meter 114 via the LAN hosted by the gateway 140 communicating with the central facility 190. In some examples disclosed herein, the example central facility 190 of FIG. 1 combines audience identification data and program identification data from multiple households to generate aggregated media monitoring information. In some examples disclosed herein, the central facility 190 may generates reports for advertisers, program producers and/or other interested parties based on the compiled statistical data. Such reports include extrapolations about the size and demographic composition of audiences of content, channels and/or advertisements based on the demographics and behavior of the monitored panelists. In examples disclosed herein, the central facility 190 may be a remote server.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In such examples, such an indicia (e.g., illuminated numerical numerals 1, 2, 3, etc.), may be illuminated in response to a communication received from the central facility 190. In the illustrated example, the meter 114 is affixed to a top of the media presentation device 110. However, the meter 114 may be affixed to the media presentation device in any other orientation such as, for example, on a side of the media presentation device 110, on the bottom of the media presentation device 110, and/or may not be affixed to the media presentation device 110. For example, the meter 114 may be placed in a location near the media presentation device 110.

Figure 2:
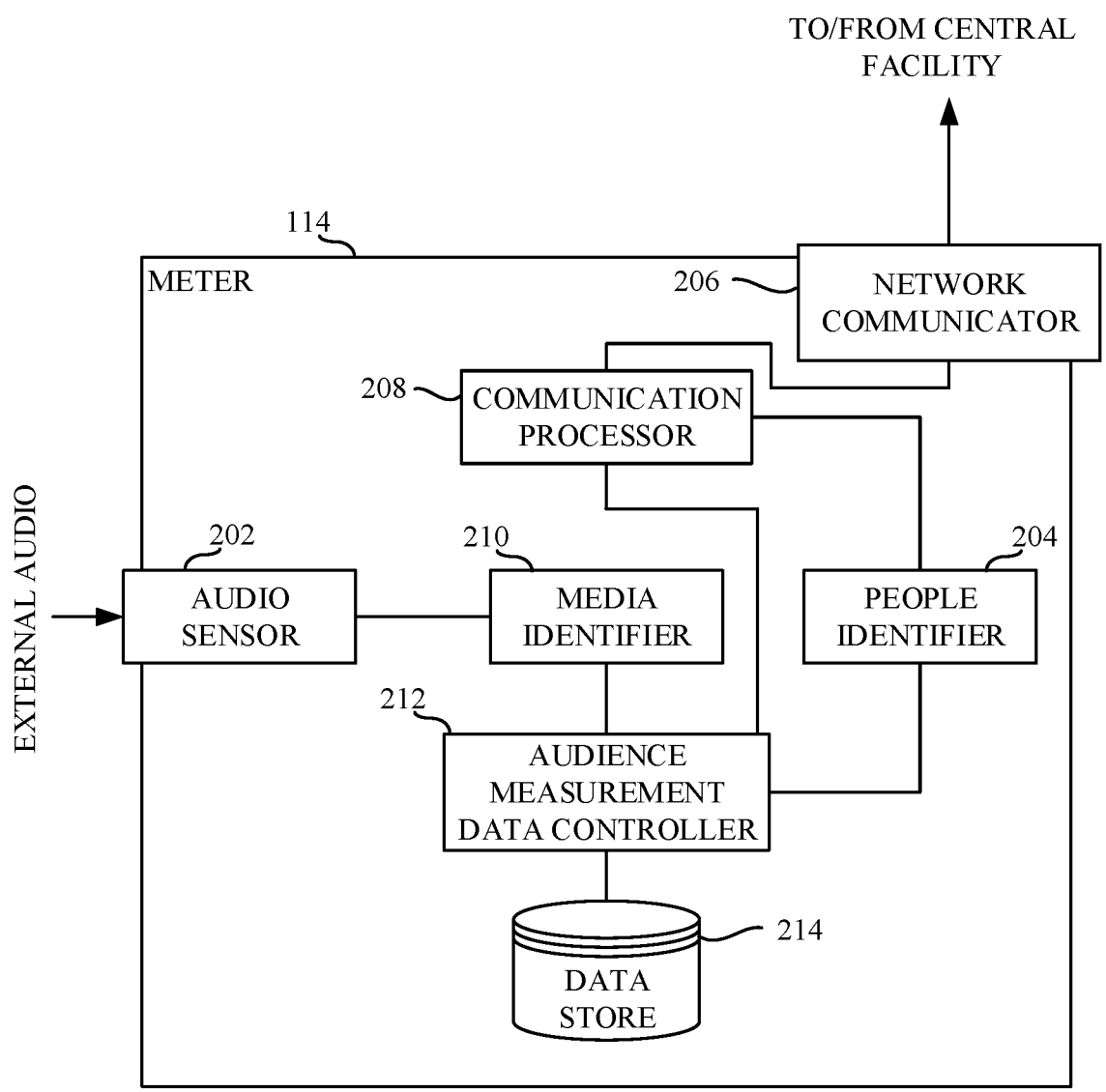
FIG. 2 is a block diagram of the example meter of FIG. 1.

FIG. 2 is a block diagram illustrating an example implementation of the example meter 114 of FIG. 1. The example meter 114 of FIG. 2 includes an example audio sensor 202, an example media identifier 204, an example network communicator 206, an example communication processor 208, an example people identifier 210, an example audience measurement data controller 212, and an example data store 214.

The example audio sensor 202 of the illustrated example of FIG. 2 is a microphone. The example audio sensor 202 receives ambient sound (e.g., free field audio) including audible media presented in the vicinity of the meter 114. Additionally or alternatively, the example audio sensor 202 may be implemented by a line input connection. The line input connection may allow the audio sensor 202 to be directly connected to an output of a media presentation device (e.g., an auxiliary output of a television, an auxiliary output of an audio/video receiver of a home entertainment system, etc.) to electronically detect identifying information and/or data (e.g., signature(s), fingerprint(s), code(s), etc.). Advantageously, the meter 114 is positioned in a location such that the audio sensor 202 receives ambient audio produced by the television and/or other devices of the home entertainment system with sufficient quality to identify media presented by the media presentation device 110 and/or other devices of the media presentation environment 102 (e.g., a surround sound speaker system). For example, in examples disclosed herein, the meter 114 may be placed on top of the television, secured to the bottom of the television, etc.

In the illustrated example of FIG. 2, one audio sensor 202 is shown. However, any other number of audio sensor(s) may additionally or alternatively be used. For example, two audio sensors may be used, four audio sensors may be used, etc. Audio received by the example audio sensor 202 is passed to the media identifier 204 for identification.

The example media identifier 204 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example media identifier 204 of the illustrated example of FIG. 2 analyzes audio received via the audio sensor 202 and identifies the media being presented. The example media identifier 204 of the illustrated example outputs an identifier of the media (e.g., media-identifying information) to the audience measurement data controller 212.

In examples disclosed herein, the media identifier 204 utilizes audio watermarking techniques to identify the media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or one or more identifier(s) that may be mapped to media identifying information, into an audio and/or video component of the media. In some examples, the audio and/or video component of the media is selected to have a signal characteristic sufficient to hide the watermark. As used herein, the terms "code" and/or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (e.g., still or moving) content and/or advertisements. In some examples, to identify watermarked media, the watermark(s) are extracted and used to access a table of reference watermarks that are mapped to media identifying information.

In some examples, the media identifier 204 may utilize signature-based media identification techniques. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The example network communicator 206 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example network communicator 206 of the illustrated example of FIG. 2 is a communication interface that receives and/or transmits corresponding communications to and/or from the central facility 190. In the illustrated example, the network communicator 206 is implemented by a WiFi radio that communicates via the LAN hosted by the example gateway 140. In some examples, the network communicator 206 facilitates wired communication via an Ethernet network hosted by the example gateway 140 of FIG. 1. In other examples disclosed herein, any other type of wireless transceiver may additionally or alternatively be used to implement the network communicator 206. In examples disclosed herein, the example network communicator 206 communicates information to the communication processor 208 which performs actions based on the received information. In other examples disclosed herein, the network communicator 206 may transmit audience measurement information provided by the audience measurement data controller 212 (e.g., data stored in the data store 214) to the central facility 190 of the audience measurement entity.

The example communication processor 208 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example communication processor 208 of the illustrated example of FIG. 2 receives information from the network communicator 206 and performs actions based on that received information. In examples disclosed herein, the communication processor 208 communicates with the people identifier 210 and/or an audience measurement data controller 212 information from the network communicator 206 that may indicate a user (e.g., one of the panelists 104, 106) is registering login information. In other examples disclosed herein, the communication processor 208 may process and/or otherwise package information from the network communicator 206 for use by the people identifier 210 and/or the audience measurement data controller 212. In addition, the communication processor 208 may communicate with the people identifier 210 to determine whether a login request originating from the configuration device 117, transmitted via the central facility 190, is successful. In such examples, a confirmation prompt and/or message is sent to the configuration device 117 via the central facility 190.

In the example of FIG. 2, the communication processor 208 may initiate a timer in response to obtaining user input information from the central facility 190 (e.g., login information originating from the configuration device 117). In such an example, when the timer exceeds a threshold limit (e.g., the timer expires), the communication processor 208 generates a re-login prompt for the configuration device 117. Such a re-login prompt indicates to the user to provide login information again.

In examples disclosed herein, the re-login prompt is transmitted to the configuration device 117 via the central facility 190. In examples disclosed herein, the re-login prompt may be indicated to the user of the configuration device 117 via a visual indicator displayed by the meter 114 (e.g., a red light).

The example people identifier 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example people identifier 210 of the illustrated example of FIG. 2 determines audience identification data representative of the identities of the audience member(s) (e.g., panelists) present in the media presentation environment 102. In some examples, the people identifier 210 collects audience identification data by periodically or a-periodically prompting audience members in the media presentation environment 102 to identify themselves as present in the audience. Panelists may identify themselves by, for example, pressing a button on a remote, speaking their name, etc. In some examples, the people identifier 210 prompts the audience member(s) to self-identify in response to one or more predetermined events (e.g., when the media presentation device 110 is turned on, a channel is changed, an infrared control signal is detected, etc.). The people identifier 210 provides the audience identification data to the audience measurement data controller such that the audience measurement data can be correlated with the media identification data to facilitate an identification of which media was presented to which audience member.

The example audience measurement data controller 212 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example audience measurement data controller 212 of the illustrated example of FIG. 2 receives media identifying information (e.g., a code, a signature, etc.) from the media identifier 204 and audience identification data from the people identifier 210, and stores the received information in the data store 214. In some examples, upon identification of media, in response to execution of a command, and/or other events within the audience measurement data controller 212, the audience measurement data controller may provide a message to the communication processor 208 indicating to prompt re-verify of audience member login information. Such a message may be sent to the configuration device 117 via the central facility 190. The example audience measurement data controller 212 periodically and/or a-periodically transmits, via the network communicator 206, the audience measurement information stored in the data store 214 to the central facility 190 for aggregation and/or preparation of media monitoring reports.

The example data store 214 of the illustrated example of FIG. 2 may be implemented by any device for storing data such as, for example, flash memory, magnetic media, optical media, etc. Furthermore, the data stored in the example data store 214 may be in any data format such as, for example, binary data, comma delimited data, tab delimited data, structured query language (SQL) structures, etc. In the illustrated example, the example data store 214 stores media identifying information collected by the media identifier 204 and audience identification data collected by the people identifier 210. In some examples, the example data store 214 additionally stores panelist demographic information such that received user identifiers of the audience measurement data can be translated into demographic information prior to transmission to the central facility 190.

Figure 3:
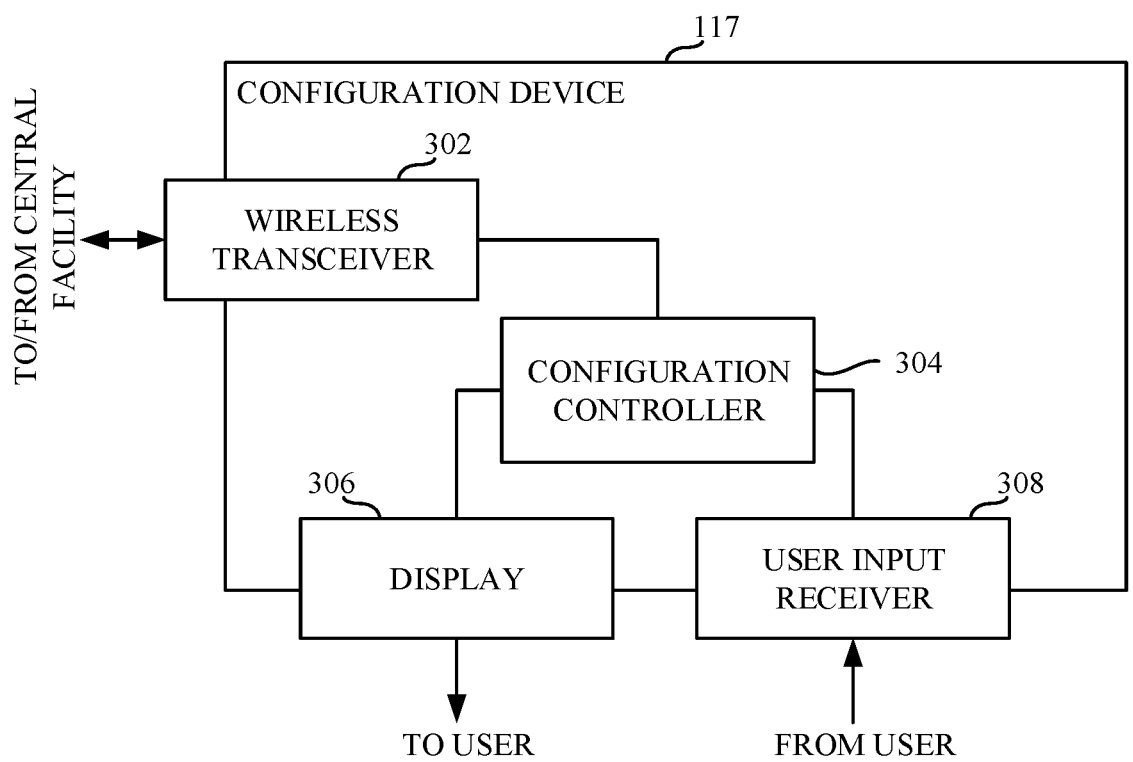
FIG. 3 is a block diagram of the example configuration device of FIG. 1.

FIG. 3 is a block diagram of the example configuration device 117 of FIG. 1. In the illustrated example of FIG. 3, the example configuration device 117 includes an example wireless transceiver 302, an example configuration controller 304, an example display 306, and an example user input receiver 308.

The example wireless transceiver 302 of the illustrated example of FIG. 3 is implemented by a WiFi radio that communicates via the LAN hosted by the example gateway 140. In some examples, the wireless transceiver 302 facilitates wired communication via an Ethernet network hosted by the example gateway 140 of FIG. 1. In other examples disclosed herein, any other type of wireless transceiver may additionally or alternatively be used to implement the wireless transceiver 302. In examples disclosed herein, the example wireless transceiver 302 enables communication to and/or from the central facility 190. Communications from the central facility 190 are passed to the configuration controller 304, which can then perform operations based on the received information.

The example configuration controller 304 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example configuration controller 304 of the illustrated example of FIG. 3 controls transmission of commands to the central facility 190 via the wireless transceiver 302 based on input received from the user input receiver 308 and/or the wireless transceiver 302. In examples disclosed herein, the configuration controller 304 transmits information received from the wireless transceiver 302 to the display 306. The configuration controller 304 may be configured to insert an indication obtained information in which the indication indicates the information is to be sent to the meter 114 via the central facility 190. For example, if the wireless transceiver 302 obtains information sent from the central facility 190 indicating a re-login prompt originating from the meter 114, then the configuration controller 304 generates a re-login prompt to be shown on the display 306. In other examples disclosed herein, the configuration controller 304 may generate a verification prompt (e.g., a re-login prompt) to be shown on the display 306 in response to an indication sent from the central facility 190, originating from the meter 114. Additionally, the configuration controller 304 may the package the login information obtained from the user and insert an indication in the packaged information, the indication indicating the packaged information is to be sent to the meter 114 via the central facility 190.

The example display 306 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example display 306 of the illustrated example of FIG. 3 displays information provided to and/or from the central facility 190 to a user of the configuration device 117. The example user input receiver 308 of the illustrated example of FIG. 3 receives input from the user such as, for example, a login request for the meter 114. In such an example, the user of the configuration device 117 provides login information on the display 306 to be transmitted to the meter 114 via the central facility 190. In examples disclosed herein, the example display 306 and the example user input receiver 308 may be implemented by a single touchscreen or individual respective touch screens. However, any other sort of user interface device(s) may additionally or alternatively be used. For example, the example display 306 may be implemented by speakers, light emitting diodes, etc. In some examples, the example user input receiver 308 may be implemented by a keyboard, a button, etc.

Figure 4:
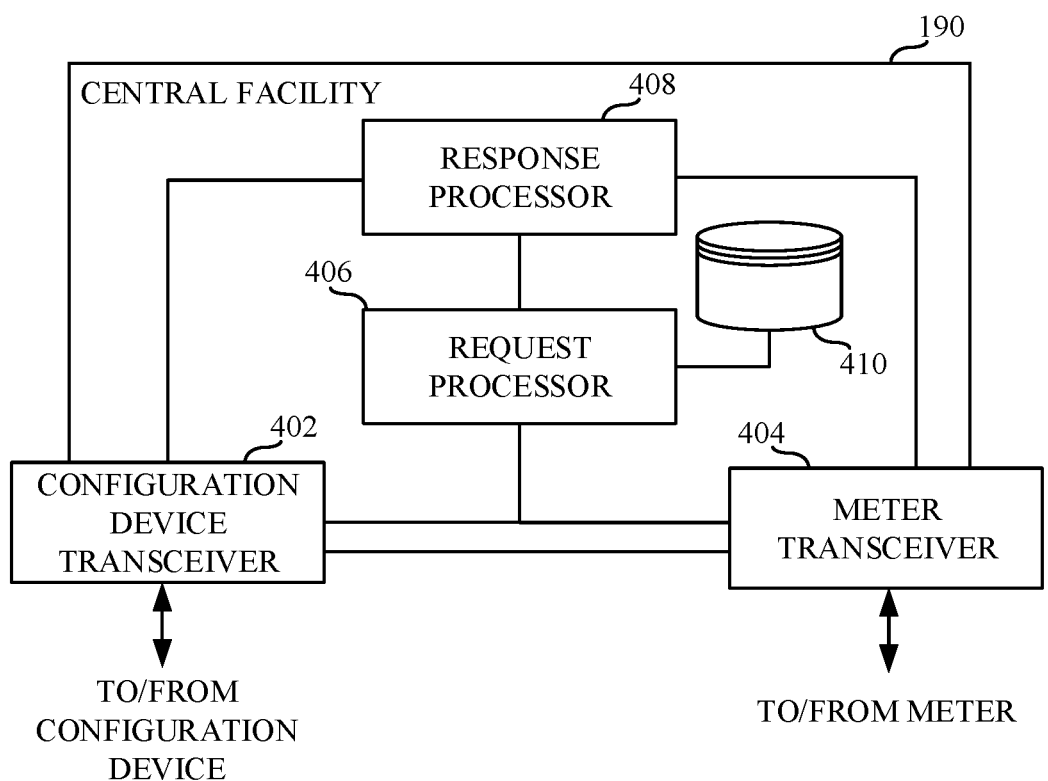
FIG. 4 is a block diagram of the example central facility of FIG. 1.

FIG. 4 is a block diagram of the example central facility 190 of FIG. 1. In the illustrated example of FIG. 4, the central facility 190 includes an example configuration device transceiver 402, an example meter transceiver 404, an example request processor 406, an example response processor 408, and an example communication log 410.

In the example illustrated in FIG. 4, the configuration device transceiver 402 is implemented by a WiFi radio that communicates via the LAN hosted by the example gateway 140 via the network 180 of FIG. 1. In some examples, the configuration device transceiver 402 facilitates wired communication via an Ethernet network hosted by the example gateway 140 of FIG. 1. In other examples disclosed herein, any other type of wireless transceiver may additionally or alternatively be used to implement the configuration device transceiver 402. In examples disclosed herein, the configuration device transceiver 402 is configured to obtain and/or otherwise transmit information to and/or from the configuration device 117 of FIG. 1. In such example, the configuration device transceiver 402 relays such information for further processing in the request processor 406. In examples disclosed herein, the configuration device transceiver 402 is configured to either obtain and/or otherwise receive information from the configuration device 117 (e.g., login information). In such examples, the configuration device transceiver 402 relays such obtained and/or otherwise received information to the request processor 406. Alternatively, the configuration device transceiver 402 is configured to transmit information to the configuration device 117 (e.g., re-login information, etc.). In such examples, the configuration device transceiver 402 obtains such information for transmission from the response processor 408.

In the example illustrated in FIG. 4, the meter transceiver 404 is implemented by a WiFi radio that communicates via the LAN hosted by the example gateway 140 via the network 180 of FIG. 1. In some examples, the meter transceiver 404 facilitates wired communication via an Ethernet network hosted by the example gateway 140 of FIG. 1. In other examples disclosed herein, any other type of wireless transceiver may additionally or alternatively be used to implement the meter transceiver 404. In examples disclosed herein, the meter transceiver 404 is configured to obtain and/or otherwise transmit information to and/or from the meter 114 of FIG. 1. In such example, the meter transceiver 404 relays such information for further processing in the request processor 406. In examples disclosed herein, the meter transceiver 404 is configured to either obtain and/or otherwise receive information from the meter 114 (e.g., a re-login request, etc.). In such examples, the meter transceiver 404 relays such obtained and/or otherwise received information to the request processor 406. Alternatively, the meter transceiver 404 is configured to transmit information to the meter 114 (e.g., login information). In such examples, the meter transceiver 404 obtains such information for transmission from the response processor 408.

The example request processor 406 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In the example illustrated in FIG. 4, the request processor 406 handles incoming request and/or information from either the configuration device transceiver 402 and/or the meter transceiver 404. In some examples disclosed herein, the request processor 406 obtains information from the configuration device transceiver 402 including login information. In such examples, the request processor 406 may store such information in the communication log 410 and/or otherwise process the login information for use by the response processor 408. Alternatively, the request processor 406 may obtain information from the meter transceiver 404 (e.g., information including a re-login request). In such examples, the request processor 406 may store such information in the communication log 410 and/or otherwise process the obtained information form the meter transceiver 404 for use by the response processor 408.

The example response processor 408 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In the example illustrated in FIG. 4, the response processor 408 handles outgoing request and/or information for either the configuration device transceiver 402 and/or the meter transceiver 404. In some examples disclosed herein, the response processor 408 obtains information from the request processor 406. In such examples, the request processor 408 packages such information and determines whether such information is to be transmitted by the configuration device transceiver 402 or the meter transceiver 404. In some examples disclosed herein, the information at the request processor 408 may include login information and, as such, the request processor 408 may determine to package and transmit such information to the meter transceiver 404. In other examples disclosed herein, the information at the request processor 408 may include a re-login prompt request and, as such, the request processor 408 may determine to package and transmit such information to the configuration device transceiver 402. In examples disclosed herein, the response processor 408 may package and/or forward information from the request processor 406 to any of the configuration device transceiver 402 and/or the meter transceiver 404.

In the example illustrated in FIG. 4, the communication log 410 of the illustrated example of FIG. 4 may be implemented by any device for storing data such as, for example, flash memory, magnetic media, optical media, etc. Furthermore, the data stored in the example communication log 410 may be in any data format such as, for example, binary data, comma delimited data, tab delimited data, structured query language (SQL) structures, etc. In the illustrated example, the example communication log 410 stores information collected by the request processor 406.

Figure 5:
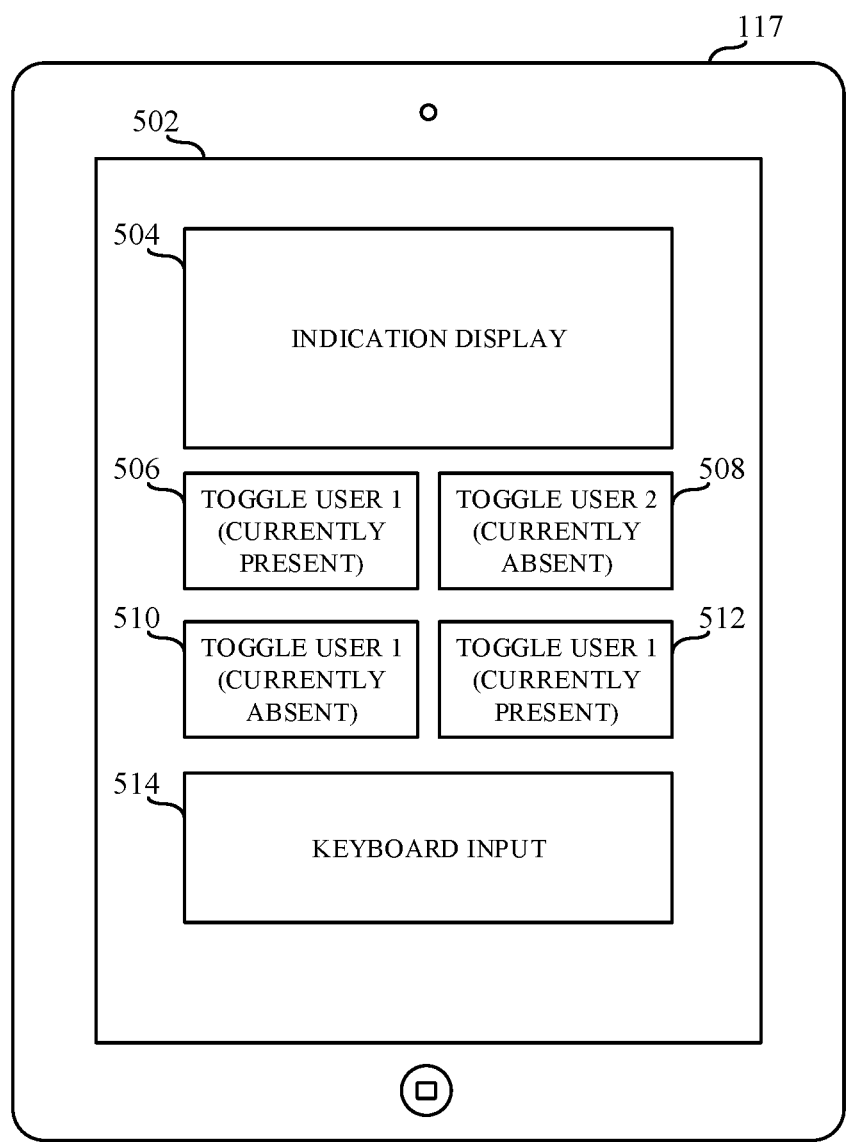
FIG. 5 is an example user interface to be presented by the configuration device of FIG. 1 and/or FIG. 3.

FIG. 5 is an example user interface 502 to be presented by the configuration device 117 of FIG. 1 and/or FIG. 3. In the example illustrated in FIG. 5, the user interface 502 may represent the example display 306 and/or the user input receiver 308 of FIG. 3. In the illustrated example of FIG. 5, the user interface 502 includes an example indication display 504, example user toggle buttons 506, 508, 510, 512, and an example keyboard 514.

In the example illustrated in FIG. 5, the indication display 504 displays a graphical interface including a prompt for the user (e.g., a re-login prompt, etc.). As such, in examples disclosed herein, the indication display 504 may highlight and/or otherwise obviate an indication originating from the meter 114 (e.g., a re-login prompt, etc.). In some examples disclosed herein, the indication display 504 may present information concerning login attempts, re-login prompts, etc.

The user interface 502 provides user toggle buttons 506, 508, 510, 512 to enable a user to log into the meter 114 and/or otherwise respond to prompts on the indication display 504. In the example illustrated in FIG. 5, the user toggle buttons 506, 508, 510, 512 illustrate user 1 is currently present, user 2 is currently absent, user 3 is currently absent, and user 4 is currently present. In examples disclosed herein, the user toggle buttons 506, 508, 510, 512 are configured to allow a user (e.g., user 1, user 2, user 3, and/or user 4) to log into the meter 114 via selecting the corresponding toggle button 506, 508, 510, 512. In some such examples, the toggle button 506, 508, 510, 512 will graphically change (e.g., the text will change from "currently absent" to "currently present", the color of the button changes from red to green, etc.) indicating whether the login attempt with the meter 114 was successful.

In other examples disclosed herein, any number of user toggle buttons 506, 508, 510, 512 may be displayed in the user interface 502. For example, if there are five members in a household, the user interface 502 may be configured to display five user toggle buttons.

In the illustrated example of FIG. 5, the user interface 502 provides the user with a keyboard input 514 to cause the configuration device 117 to display a keyboard (e.g., a soft keyboard) to the user to facilitate login information for a new user. For example, if a new user enters the household, such new user can enter their corresponding login information via the keyboard input 514 to log into the meter 114. However, user input may be received in any other fashion such as, for example, a physical keyboard, voice recognition, etc. While a user is to enter text representing login information to be executed in the illustrated example of FIG. 5, in some examples, a user interface to allow the user to select a command (e.g., from a list of commands) and to enter parameters for the command may be provided. In some examples, the keyboard input 514 may be omitted.

Figure 6:
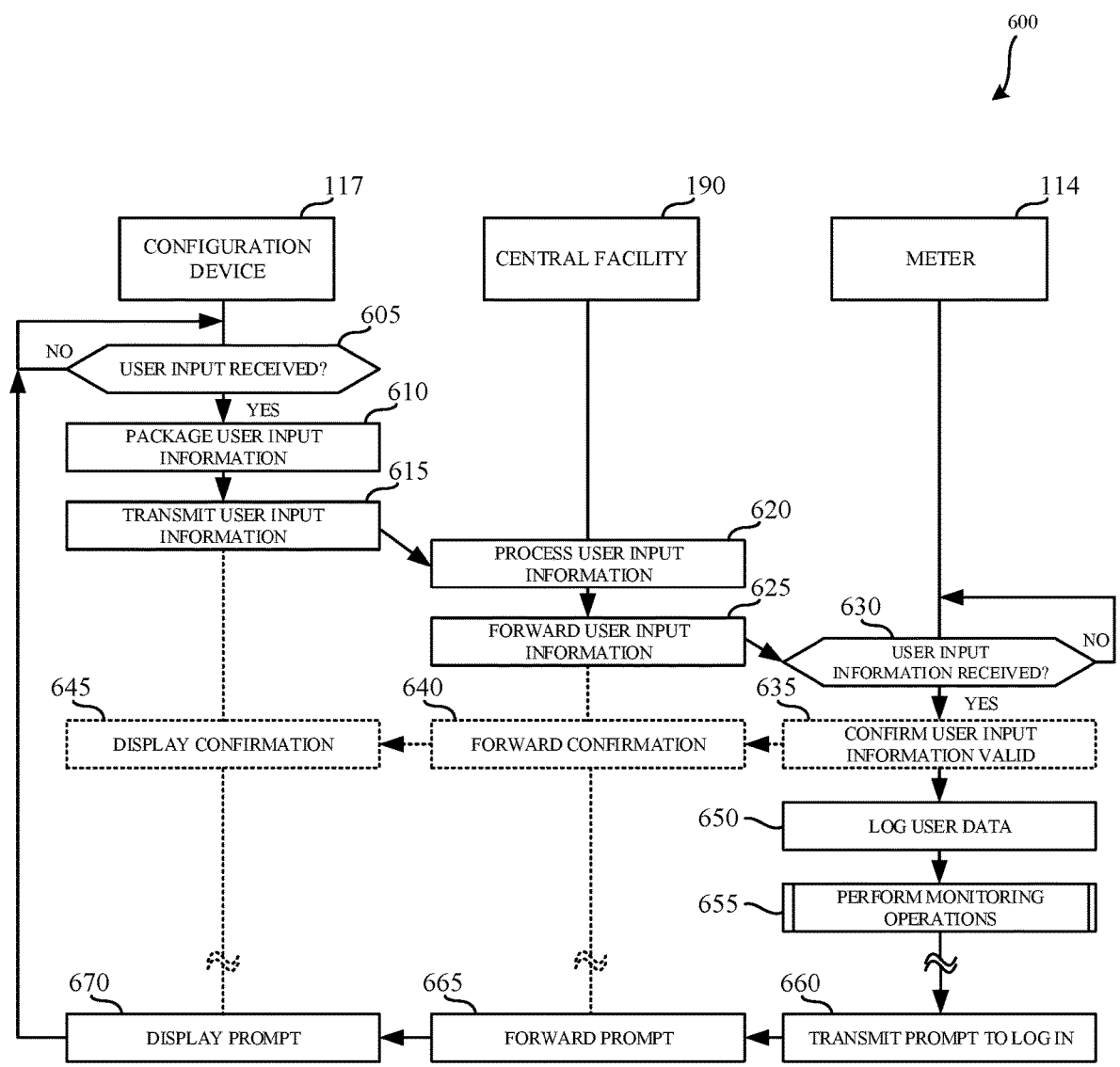
FIG. 6 is a flowchart representative of example machine readable instructions which may be executed to implement the meter, the configuration device, and/or the central facility of FIGS. 1, 2, 3, and/or 4.

While an example manner of implementing the meter 114, configuration device 117, and/or the central facility 190 of FIGS. 1, 2, 3, and/or 4 is illustrated in FIGS. 6 and/or 7, one or more of the elements, processes and/or devices illustrated in FIGS. 1, 2, 3, and/or 4 may be combined, divided, re-arranged, omitted, eliminated and/or implemented in any other way. Further, the example audio sensor 202, the example media identifier 204, the example network communicator 206, the example communication processor 208, the example people identifier 210, the example audience measurement data controller 212, the example data store 214 and/or, more generally, the example meter 114 of FIGS. 1 and/or 2, the example wireless transceiver 302, the example configuration controller 304, the example display 306, the example user input receiver 308, and/or, more generally, the example configuration device 117 of FIGS. 1 and/or 3, the example configuration device transceiver 402, the example meter transceiver 404, the example request processor 406, the example response processor 408, the example configuration log 410, and/or, more generally, the example central facility 190 of FIGS. 1 and/or 4 may be implemented by hardware, software, firmware and/or any combination of hardware, software and/or firmware. Thus, for example, any of the example audio sensor 202, the example media identifier 204, the example network communicator 206, the example communication processor 208, the example people identifier 210, the example audience measurement data controller 212, the example data store 214 and/or, more generally, the example meter 114 of FIGS. 1 and/or 2, the example wireless transceiver 302, the example configuration controller 304, the example display 306, the example user input receiver 308, and/or, more generally, the example configuration device 117 of FIGS. 1 and/or 3, the example configuration device transceiver 402, the example meter transceiver 404, the example request processor 406, the example response processor 408, the example configuration log 410, and/or, more generally, the example central facility 190 of FIGS. 1 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio sensor 202, the example media identifier 204, the example network communicator 206, the example communication processor 208, the example people identifier 210, the example audience measurement data controller 212, the example data store 214 and/or, more generally, the example meter 114 of FIGS. 1 and/or 2, the example wireless transceiver 302, the example configuration controller 304, the example display 306, the example user input receiver 308, and/or, more generally, the example configuration device 117 of FIGS. 1 and/or 3, the example configuration device transceiver 402, the example meter transceiver 404, the example request processor 406, the example response processor 408, the example configuration log 410, and/or, more generally, the example central facility 190 of FIGS. 1 and/or 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter 114, configuration device 117, and/or the central facility 190 of FIGS. 1, 2, 3, and/or 4 may include one or more elements, processes and/or devices in addition to, or instead of, those illustrated in FIGS. 1, 2, 3, and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the meter 114, configuration device 117, and/or the central facility 190 of FIGS. 1, 2, 3, and/or 4 are shown in FIGS. 6 and/or 7. The machine readable instructions may be one or more executable programs or portion(s) of an executable program for execution by a computer processor such as the processor 812, 912, 1012 shown in the example processor platform 800, 900, 1000 discussed below in connection with FIGS. 8, 9, and 10. The program may be embodied in software stored on a non-transitory computer readable storage medium such as a CD-ROM, a floppy disk, a hard drive, a DVD, a Blu-ray disk, or a memory associated with the processor 812, 912, 1012, but the entire program and/or parts thereof could alternatively be executed by a device other than the processor 812, 912, 1012 and/or embodied in firmware or dedicated hardware. Further, although the example program is described with reference to the flowchart illustrated in FIGS. 6 and/or 7, many other methods of implementing the example meter 114, configuration device 117, and/or the central facility 190 of FIGS. 1, 2, 3, and/or 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of example machine readable instructions 600 which may be executed to implement the meter 114, the configuration device 117, and/or the central facility 190 of FIGS. 1, 2, 3, and/or 4. In the example illustrated in FIG. 6, the configuration controller 304 of the configuration device 117 determines whether user input is received. (Block 605). For example, the configuration controller 304 may communicate with the user input receiver 308 to obtain and/or otherwise receive information including user login information. In the example illustrated in FIG. 6, if the configuration controller 304 determines user input is not received (e.g., block 605 returns a result of NO), control returns to block 605. Alternatively, if the configuration controller 304 determines user input is received (e.g., block 605 returns a result of YES), the configuration controller 304 packages the user input information. (Block 610). In examples disclosed herein, the user input information may be any information and/or data including user login information, user demographics, total user count, etc. In response, the wireless transceiver 302 of the configuration device 117 transmits the user input information to the central facility 190. (Block 615).

In response, the request processor 406 of the central facility 190 processes the user input information. (Block 620). In some examples disclosed herein, the request processor 406 may process user input information from the configuration device transceiver 402 (e.g., login information). Alternatively, the request processor 406 may process user input information from the meter transceiver 404 (e.g., a re-login prompt, etc.). In the example illustrated in FIG. 6, the user information is login information from the configuration device 117 and thus, the response processor 408 transmits such user information to the meter 114. (Block 625). In other examples disclosed herein, the user information may be information originating from the meter 114 and thus, is intended for the configuration device 117.

The communication processor 208, via the network communicator 206, determines whether user input was received. (Block 630). In the example illustrated in FIG. 6, if the communication processor 208 determines user input is not received (e.g., block 630 returns a result of NO), control returns to block 630. Alternatively, if the communication processor 208 determines user input is received (e.g., block 630 returns a result of YES), then control proceeds to block 635.

In some examples disclosed herein, the communication processor 208 confirms whether the user input information is received and applied successfully. (Block 635). For example, if the user input information includes login information, then the communication processor 208 communicates with the people identifier 210 to confirm whether the user input information is successfully verified (e.g., a user is match with the user input information). In such an example, the confirmation is sent to the central facility 190 in which the response processor 408 forwards such confirmation to the configuration device 117. (Block 640). The configuration controller 304 communicates to the display 306 to display the confirmation. (Block 645).

In addition, the audience measurement data controller 212 communicates with the media identifier 204 to log user data. (Block 650). The communication processor 208 communicates with the audience measurement data controller 212 to perform monitoring operations. (Block 655). Example monitoring operations and/or instructions structured to execute the control of block 655 is explained in further detail below in connection with FIG. 7.

As a result of performing monitoring operations, the network communicator 206 transmits a prompt intended for the configuration device 117 to the central facility 190. (Block 660). In such an example, the response processor 408 forwards such prompt to the configuration device 117. (Block 665). The configuration controller 304 communicates to the display 306 to cause display of the prompt. (Block 670). Control then returns to block 605, where the configuration controller 304 of the configuration device 117 determines whether user input is received. The example instructions 600 of FIG. 6 may then be repeated in the event a re-login prompt is sent to the configuration device 117, a new audience member (e.g., one of the panelists 104, 106 of FIG. 1) begins viewing media on the media presentation device 110, etc.

Figure 7:
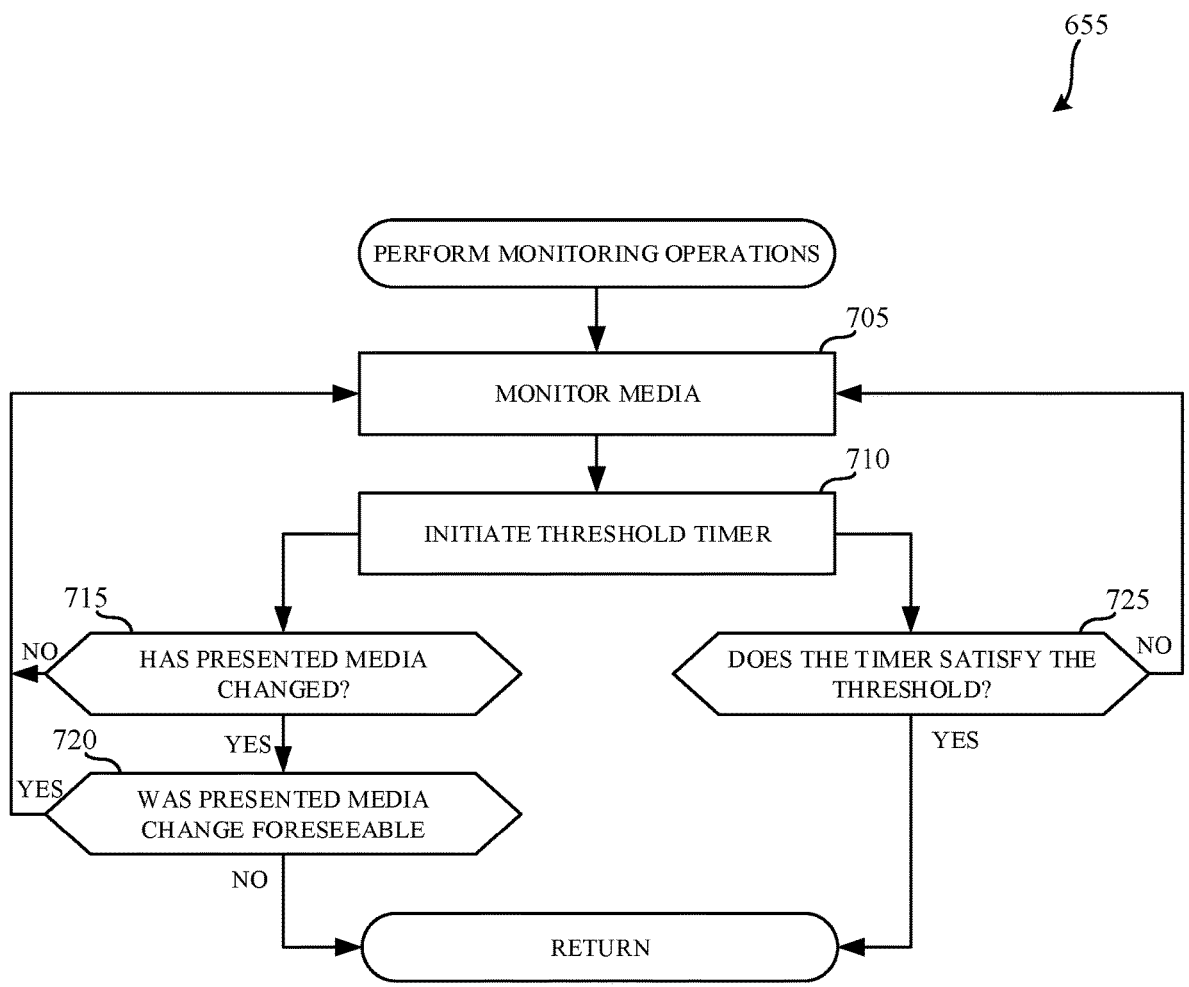
FIG. 7 is a flowchart representative of example machine readable instructions which may be executed to implement the example meter of FIGS. 1 and/or 2.

FIG. 7 is a flowchart representative of example machine readable instructions which may be executed to implement the example meter 114 of FIGS. 1 and/or 2. In the example of FIG. 7, control is initiated by the media identifier 204 in which the media identifier monitors incoming media (e.g., media obtained through the audio sensor 202). (Block 705). In addition, the communication processor 208 initiates a timer including a threshold limit. (Block 710). In response, the communication processor 208 communicates with the audience measurement data controller 212 to determine whether the presented media has changed. (Block 715). In such examples, if the presented media has changed (e.g., block 715 returns a result of YES), the communication processor 208 determines whether the presented media change was foreseeable. (Block 720). In some examples, and if the presented media change was not foreseeable, (e.g., block 720 returns a result of NO), then control return to block 660 of FIG. 6. For example, the communication processor 208 may determine the presented media change was not foreseeable if there is a change from monitoring a young children's cartoon to monitoring a home improvement show. Alternatively, if the communication processor 208 determines that the presented media has not changed (e.g., block 715 returns a result of NO), or if the communication processor 208 determines the presented media change was foreseeable (e.g., block 720 returns a result of YES), then control returns to block 705.

In a parallel operation, the communication processor 208 determines whether the timer satisfies the threshold limit. (Block 725). In examples disclose herein, if the communication processor 208 determines the timer satisfies the threshold limit (e.g., block 725 returns a result of YES), then control returns to block 660 of FIG. 6. Alternatively, if the communication processor 208 determines the timer does not satisfy the threshold limit (e.g., block 725 returns a result of NO), then control returns to block 705. While in the illustrated example of FIG. 7, block 725 is illustrated as being executed in parallel with blocks 715 and 720, in some example, blocks 715, 720, and 725 may be executed in a serial fashion. The example instructions 700 of FIG. 7 may then be repeated in the event new user data is logged by the audience measurement data controller 214 of FIG. 2, a re-login prompt is sent to the configuration device 117, a new audience member (e.g., one of the panelists 104, 106 of FIG. 1) begins viewing media on the media presentation device 110, etc.

Figure 8:
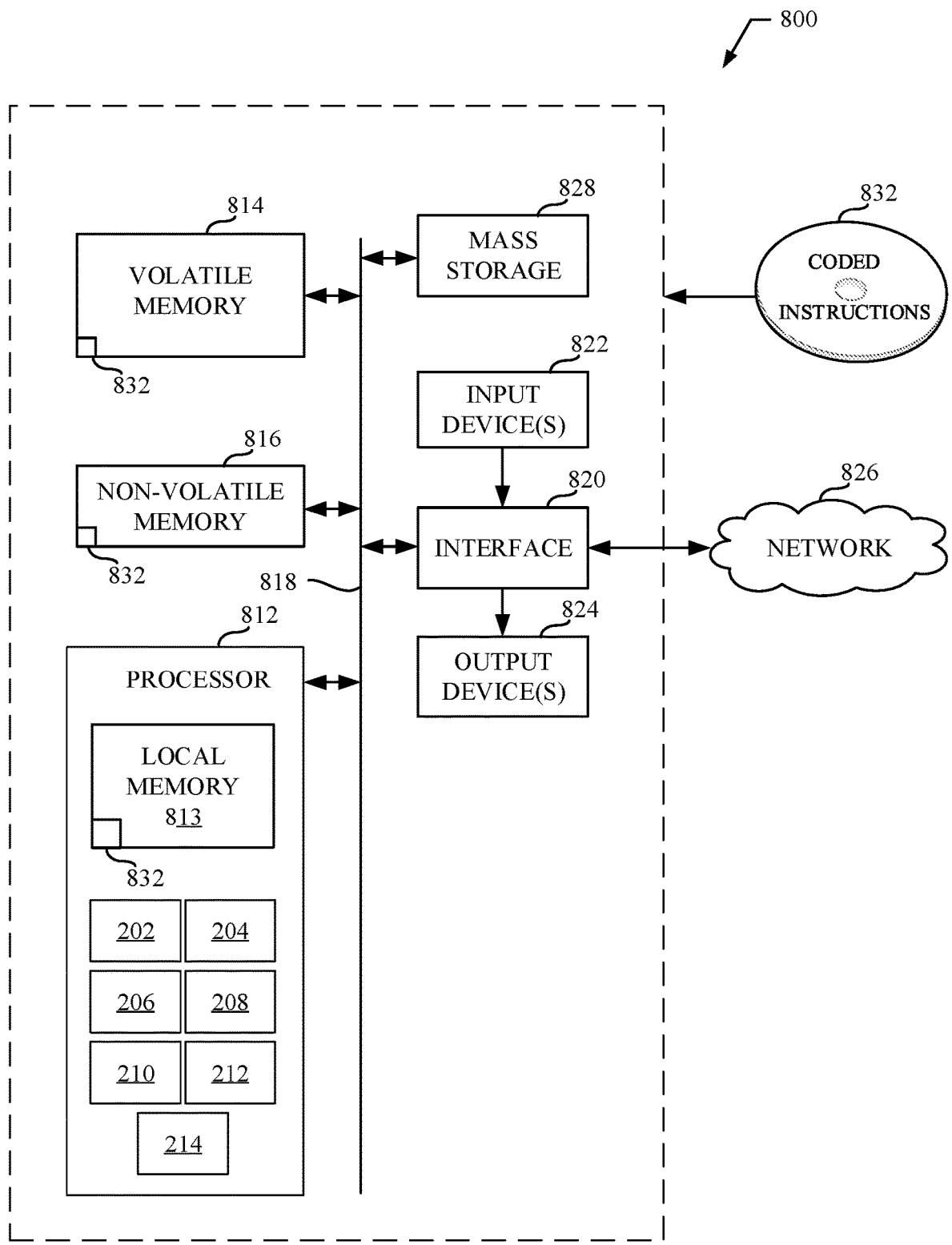
FIG. 8 is a block diagram of an example processor platform structured to execute the instructions of FIGS. 6 and/or 7 to implement the example meter of FIGS. 1 and/or 2.

FIG. 8 is a block diagram of an example processor platform 800 structured to execute the instructions of FIGS. 6 and/or 7 to implement the example meter 114 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audio sensor 202, the example media identifier 204, the example network communicator 206, the example communication processor 208, the example people identifier 210, the example audience measurement data controller 212, and/or the example data store 214.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and/or 7 may be stored in the mass storage device 828, in the volatile memory 814, in the non-volatile memory 816, and/or on a removable non-transitory computer readable storage medium such as a CD or DVD.

Figure 9:
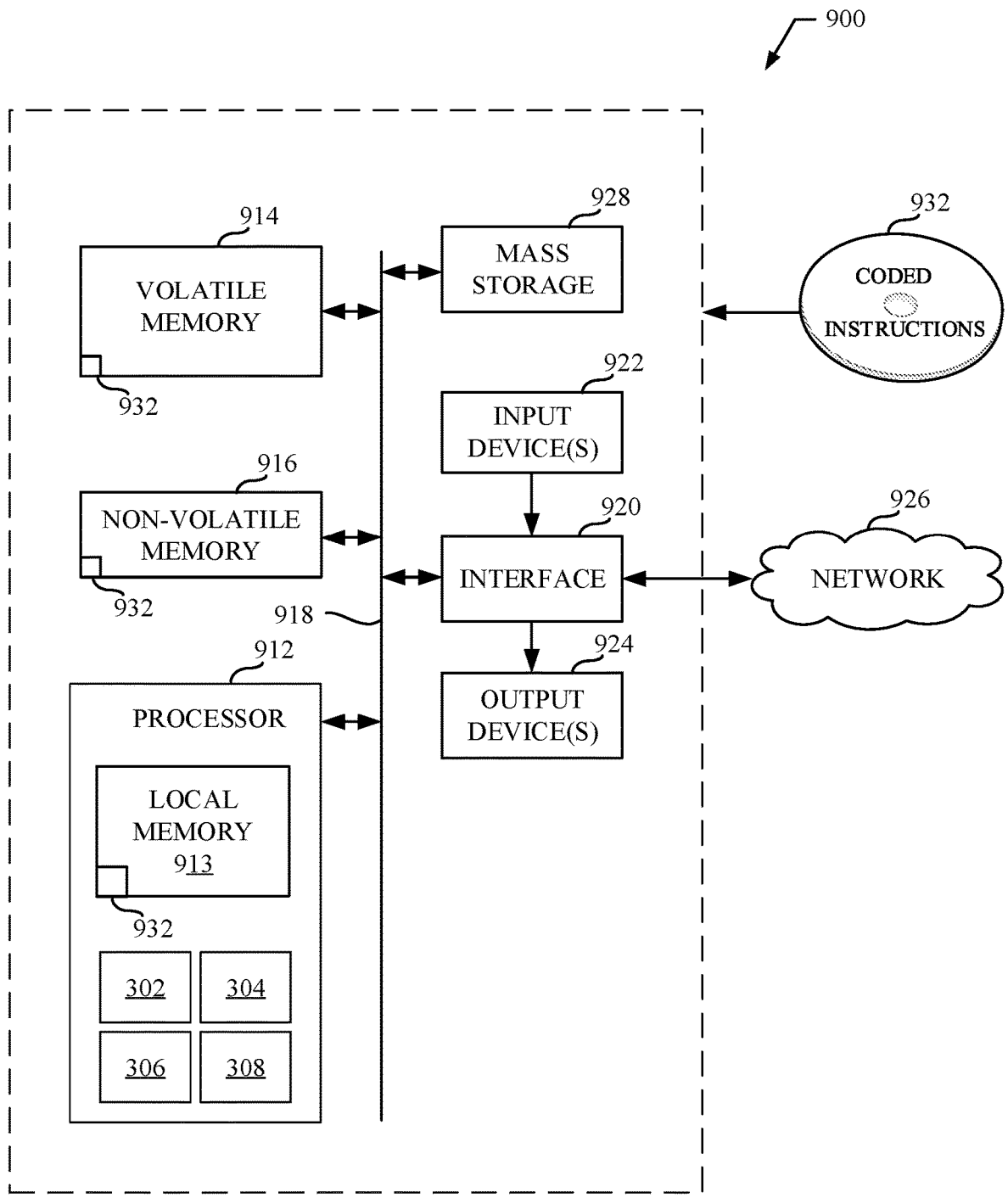
FIG. 9 is a block diagram of an example processor platform structured to execute the instructions of FIG. 6 to implement the example configuration device of FIGS. 1 and/or 3.

FIG. 9 is a block diagram of an example processor platform 900 structured to execute the instructions of FIG. 6 to implement the example configuration device 117 of FIGS. 1 and/or 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example wireless transceiver 302, the example configuration controller 304, the example display 306, and/or the example user input receiver 308.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 6 may be stored in the mass storage device 928, in the volatile memory 914, in the non-volatile memory 916, and/or on a removable non-transitory computer readable storage medium such as a CD or DVD.

Figure 10:
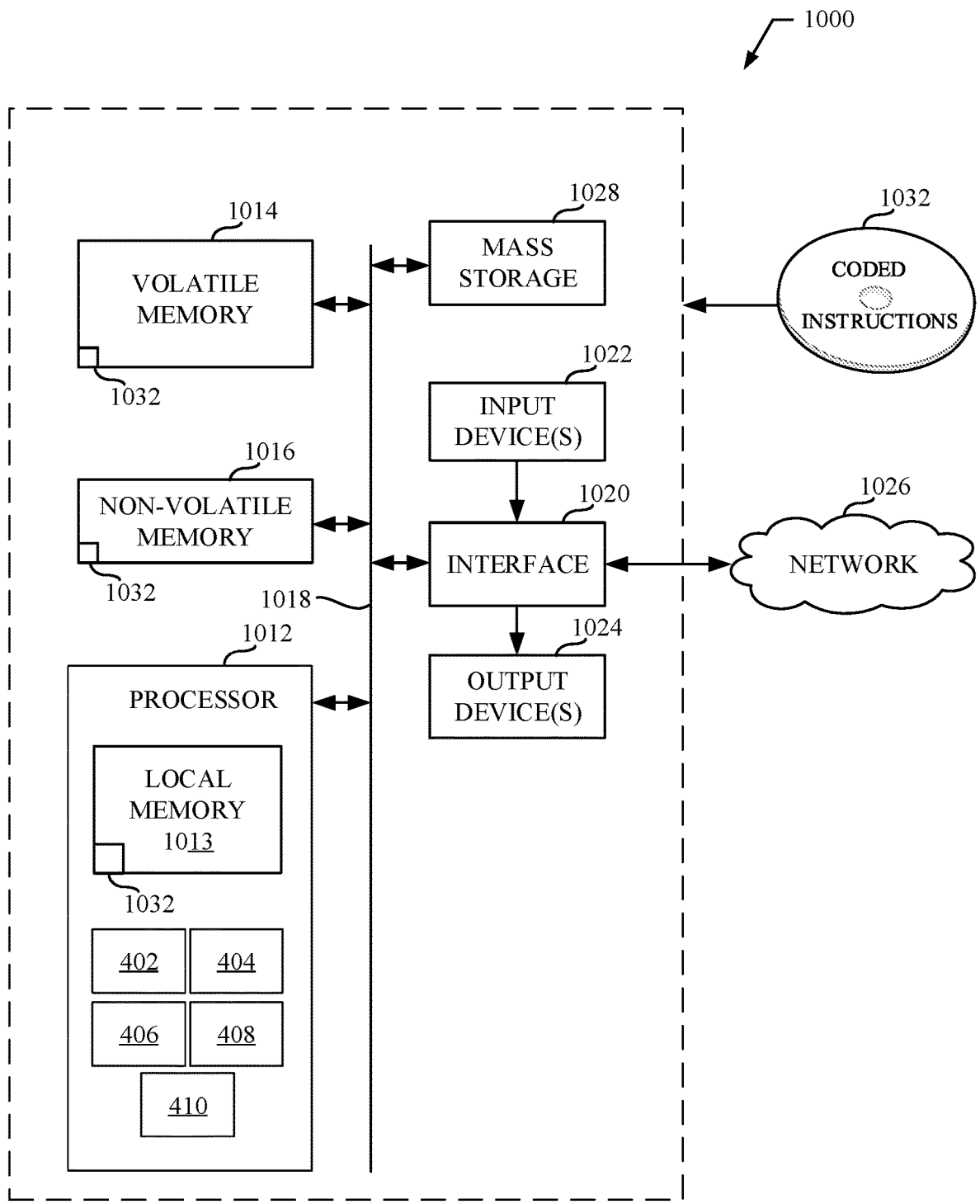
FIG. 10 is a block diagram of an example processor platform structured to execute the instructions of FIG. 6 to implement the central facility of FIGS. 1 and/or 4.

FIG. 10 is a block diagram of an example processor platform 1000 structured to execute the instructions of FIG. 6 to implement the central facility 190 of FIGS. 1 and/or 4. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example configuration device transceiver 402, the example meter transceiver 404, the example request processor 406, the example response processor 408, and the example communication log 410.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 6 may be stored in the mass storage device 1028, in the volatile memory 1014, in the non-volatile memory 1016, and/or on a removable non-transitory computer readable storage medium such as a CD or DVD.

Example methods, apparatus, systems, and articles of manufacture to identify user presence to a meter are disclosed herein. Further examples and combinations thereof include the following:

Example 1 includes an apparatus to identify user presence to a meter, the apparatus comprising a user input receiver to obtain presence information from a panelist via a prompt displayed by a user interface of the apparatus, the presence information indicating that the panelist is present at the meter separate from the apparatus, a configuration controller to package the presence information, and insert an indication in the packaged presence information, the indication indicating the packaged presence information is to be sent to the meter via a remote server, and a wireless transceiver to transmit the packaged presence information to the remote server.

Example 2 includes the apparatus of example 1, wherein the prompt is obtained in response to a communication from the meter via the remote server.

Example 3 includes the apparatus of example 1, wherein prompt is a re-login prompt obtained in response to a communication from the meter via the remote server.

Example 4 includes the apparatus of example 1, wherein the user input receiver is implemented by a touchscreen.

Example 5 includes the apparatus of example 1, wherein the wireless transceiver is implemented by a WiFi radio that enables communication with the remote server.

Example 6 includes the apparatus of example 1, wherein the user interface is further to display a confirmation in response to the wireless transceiver obtaining a confirmation from the remote server.

Example 7 includes the apparatus of example 1, wherein the configuration controller is implemented as a downloadable application in the apparatus.

Example 8 includes a non-transitory computer readable storage medium comprising instructions which, when executed, cause at least one processor to at least obtain presence information from a panelist via a prompt displayed by a user interface, the presence information indicating that the panelist is present at a meter separate from the non-transitory computer readable storage medium, package the presence information, insert an indication in the packaged presence information, the indication indicating the packaged presence information is to be sent to the meter via a remote server, and transmit the packaged presence information to the remote server.

Example 9 includes the non-transitory computer readable storage medium of example 8, wherein the prompt is obtained in response to a communication from the meter via the remote server.

Example 10 includes the non-transitory computer readable storage medium of example 8, wherein prompt is a re-login prompt obtained in response to a communication from the meter via the remote server.

Example 11 includes the non-transitory computer readable storage medium of example 8, wherein the instructions, when executed, cause the at least one processor to obtain the presence information via a touchscreen.

Example 12 includes the non-transitory computer readable storage medium of example 8, wherein the instructions, when executed, cause the at least one processor to enable communication with the remote server via a WiFi radio.

Example 13 includes the non-transitory computer readable storage medium of example 8, wherein the instructions, when executed, cause the at least one processor to present a confirmation in response to obtaining a confirmation from the remote server.

Example 14 includes the non-transitory computer readable storage medium of example 8, wherein the at least one processor is implemented as a downloadable application.

Example 15 includes a method to identify user presence to a meter, the method comprising obtaining presence information from a panelist via a prompt displayed by a user interface, the presence information obtained at a location separate from the meter and indicating that the panelist is present at the meter, packaging the presence information, inserting an indication in the packaged presence information, the indication indicating the packaged presence information is to be sent to the meter via a remote server, and transmitting the packaged presence information to the remote server.

Example 16 includes the method of example 15, wherein the prompt is obtained in response to a communication from the meter via the remote server.

Example 17 includes the method of example 15, wherein prompt is a re-login prompt obtained in response to a communication from the meter via the remote server.

Example 18 includes the method of example 15, further including obtaining the presence information via a touchscreen.

Example 19 includes the method of example 15, further including enabling communication with the remote server.

Example 20 includes the method of example 15, further including presenting a confirmation in response to obtaining a confirmation from the remote server.

Example 21 includes the method of example 15, wherein the packaging and inserting is performed in a downloadable application.

Example 22 includes an apparatus to identify user presence to a meter, the apparatus comprising means for obtaining presence information from a panelist via a prompt displayed by a user interface, the presence information indicating that the panelist is present at the meter separate from the apparatus, means for packaging the presence information, the means for packaging to insert an indication in the packaged presence information, the indication indicating the packaged presence information is to be sent to the meter via a remote server, and means for transmitting the packaged presence information to the remote server. The example means for obtaining is implemented by the user input receiver 308 of FIG. 3. The example means for packaging is implemented by the configuration controller 304 of FIG. 3. The example means for transmitting is implemented by the wireless transceiver 302 of FIG. 3.

Example 23 includes the apparatus of example 22, wherein the prompt is obtained in response to a communication from the meter via the remote server.

Example 24 includes the apparatus of example 22, wherein prompt is a re-login prompt obtained in response to a communication from the meter via the remote server.

Example 25 includes the apparatus of example 22, wherein the means for obtaining is implemented by a user input receiver.

Example 26 includes the apparatus of example 22, wherein the means for transmitting is implemented by a WiFi radio that enables communication with the remote server.

Example 27 includes the apparatus of example 22, further including a means for displaying to present a confirmation in response to the means for transmitting obtaining a confirmation from the remote server. The example means for displaying is implemented by the display 306 of FIG. 3.

Example 28 includes the apparatus of example 22, wherein the means for packaging is implemented as a downloadable application in the apparatus. From the foregoing, it will be appreciated that example methods, apparatus and articles of manufacture have been disclosed that identify user presence to a meter. The disclosed methods, apparatus and articles of manufacture improve the efficiency of using a computing device by enabling communication between a configuration device and a meter through a central facility. In examples disclosed herein, communication to a meter by a user of the configuration device can be accomplished if the user is not in the same room as the meter. In examples disclosed herein, the meter may communicate to the configuration device, via the central facility, a prompt instructing the user to re-login to the meter. Examples disclosed herein overcome the problem occurring when a user is unable to directly log in to the meter. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to identify user presence to a meter, the apparatus comprising:
   a user input receiver to obtain presence information from a panelist via a request prompt displayed by a user interface of the apparatus, the presence information indicating that the panelist is present at the meter separate from the apparatus, the meter to monitor media presented by a media presentation device, the apparatus separate from the media presentation device;
   a configuration controller to:
      package the presence information; and
      insert an indication in the packaged presence information, the indication indicating the packaged presence information is to be sent to the meter via a remote server; and
   a wireless transceiver to transmit the packaged presence information to the remote server and relay a confirmation message to the configuration controller, the packaged presence information to indicate to the remote server that the panelist is present at the meter, the confirmation message including an indication that the presence information has been received at the remote server, the relaying of the confirmation message to cause display of a confirmation prompt via the user interface of the apparatus, the confirmation prompt indicating that the presence information has been received at the remote server, the confirmation prompt not displayed by the media presentation device.

2. The apparatus of claim 1, wherein the request prompt is obtained in response to a communication from the meter via the remote server.

3. The apparatus of claim 1, wherein the request prompt is a re-login prompt obtained in response to a communication from the meter via the remote server.

4. The apparatus of claim 1, wherein the user input receiver is implemented by a touchscreen.

5. The apparatus of claim 1, wherein the wireless transceiver is implemented by a WiFi radio that enables communication with the remote server.

6. The apparatus of claim 1, wherein the user interface is further to display a confirmation in response to the wireless transceiver obtaining a confirmation from the remote server.

7. The apparatus of claim 1, wherein the configuration controller is implemented as a downloadable application in the apparatus.

8. A non-transitory computer readable storage medium comprising instructions which, when executed, cause at least one processor to at least:
   obtain presence information from a panelist via a request prompt displayed by a user interface, the presence information indicating that the panelist is present at a meter separate from the non-transitory computer readable storage medium, the meter to monitor media presented by a media presentation device, the non-transitory computer readable storage medium separate from the media presentation device;
   package the presence information;
   insert an indication in the packaged presence information, the indication indicating the packaged presence information is to be sent to the meter via a remote server;
   transmit the packaged presence information to the remote server, the packaged presence information to indicate to the remote server that the panelist is present at the meter; and
   cause display of a confirmation prompt via the user interface of the non-transitory computer readable storage medium, the confirmation prompt in response to an indication that the remote server has received the packaged presence information, the confirmation prompt to indicate that the presence information has been received at the remote server, the confirmation prompt not displayed by the media presentation device.

9. The non-transitory computer readable storage medium of claim 8, wherein the request prompt is obtained in response to a communication from the meter via the remote server.

10. The non-transitory computer readable storage medium of claim 8, wherein the request prompt is a re-login prompt obtained in response to a communication from the meter via the remote server.

11. The non-transitory computer readable storage medium of claim 8, wherein the instructions, when executed, cause the at least one processor to obtain the presence information via a touchscreen.

12. The non-transitory computer readable storage medium of claim 8, wherein the instructions, when executed, cause the at least one processor to enable communication with the remote server via a WiFi radio.

13. The non-transitory computer readable storage medium of claim 8, wherein the instructions, when executed, cause the at least one processor to present a confirmation in response to obtaining a confirmation from the remote server.

14. The non-transitory computer readable storage medium of claim 8, wherein the at least one processor is implemented as a downloadable application.

15. An apparatus to identify user presence to a meter, the apparatus comprising:
   means for obtaining presence information from a panelist via a request prompt displayed by a user interface, the presence information indicating that the panelist is present at the meter separate from the apparatus, the meter to monitor media presented by a media presentation device, the apparatus separate from the media presentation device;
   means for packaging the presence information, the means for packaging to insert an indication in the packaged presence information, the indication indicating the packaged presence information is to be sent to the meter via a remote server;
   means for transmitting the packaged presence information to the remote server, the packaged presence information to indicate to the remote server that the panelist is present at the meter; and
   means for relaying a confirmation message to the means for packaging, the confirmation message including an indication that the presence information has been received at the remote server, the relaying of the confirmation message to cause display of a confirmation prompt via the user interface of the apparatus, the confirmation prompt indicating that the presence information has been received at the remote server, the confirmation prompt not displayed by the media presentation device.

16. The apparatus of claim 15, wherein the request prompt is obtained in response to a communication from the meter via the remote server.

17. The apparatus of claim 15, wherein the request prompt is a re-login prompt obtained in response to a communication from the meter via the remote server.

18. The apparatus of claim 15, wherein the means for transmitting is implemented by a WiFi radio that enables communication with the remote server.

19. The apparatus of claim 15, further including a means for displaying to present a confirmation in response to the means for transmitting obtaining a confirmation from the remote server.

20. The apparatus of claim 15, wherein the means for packaging is implemented as a downloadable application in the apparatus.

21. A method to identify user presence to a meter, the method comprising:

obtaining presence information from a panelist via a request prompt displayed by a user interface, the presence information indicating that the panelist is present at the meter separate from the user interface, the meter to monitor media presented by a media presentation device, the user interface separate from the media presentation device;

packaging the presence information;

inserting an indication in the packaged presence information, the indication indicating the packaged presence information is to be sent to the meter via a remote server; and transmitting the packaged presence information to the remote server, the packaged presence information to indicate to the remote server that the panelist is present at the meter; and causing display of a confirmation prompt via the user interface, the confirmation prompt in response to an indication that the remote server has received the packaged presence information, the confirmation prompt to indicate that the presence information has been received at the remote server, the confirmation prompt not displayed by the media presentation device.

22. The method of claim 21, wherein the request prompt is obtained in response to a communication from the meter via the remote server.

23. The method of claim 21, wherein the request prompt is a re-login prompt obtained in response to a communication from the meter via the remote server.

24. The method of claim 21, further including obtaining the presence information via a touchscreen.

25. The method of claim 21, further including implementing a WiFi radio to enable communication with the remote server.

26. The method of claim 21, further including presenting a confirmation in response to obtaining a confirmation from the remote server.

27. The method of claim 21, wherein the packaging and inserting is performed in a downloadable application.

* * * * *